(12) United States Patent
Scherson

(10) Patent No.: US 10,883,187 B2
(45) Date of Patent: *Jan. 5, 2021

(54) ELECTROCHEMICAL METHOD AND APPARATUS FOR FORMING A VACUUM IN A SEALED ENCLOSURE

(71) Applicant: Daniel A. Scherson, Beachwood, OH (US)

(72) Inventor: Daniel A. Scherson, Beachwood, OH (US)

(73) Assignee: ATMOSPHERIX LLC, Beachwood, OH (US)

(*) Notice: Subject to any disclaimer, the term of this patent is extended or adjusted under 35 U.S.C. 154(b) by 265 days.

This patent is subject to a terminal disclaimer.

(21) Appl. No.: 15/835,536

(22) Filed: Dec. 8, 2017

(65) Prior Publication Data
US 2018/0105948 A1    Apr. 19, 2018

Related U.S. Application Data (62) Division of application No. 14/505,525, filed on Oct. 3, 2014, now Pat. No. 9,863,055.

(60) Provisional application No. 61/887,489, filed on Oct. 7, 2013, provisional application No. 61/973,428, filed on Apr. 1, 2014.

(51) Int. Cl.
| | | |
|---|---|---|
| C25D 1/00 | (2006.01) | |
| C25D 21/04 | (2006.01) | |
| C25D 5/48 | (2006.01) | |
| C25D 17/00 | (2006.01) | |
| F16L 59/065 | (2006.01) | |
| H01J 7/18 | (2006.01) | |
| C25D 3/00 | (2006.01) | |
| H01M 16/00 | (2006.01) | |
| H01J 9/385 | (2006.01) | |
| C25D 17/10 | (2006.01) | |

(Continued)

(52) U.S. Cl.
CPC ............... *C25D 21/04* (2013.01); *C25D 3/00* (2013.01); *C25D 5/48* (2013.01); *C25D 17/00* (2013.01); *C25D 17/002* (2013.01); *C25D 17/10* (2013.01); *C25D 21/12* (2013.01); *F04B 37/02* (2013.01); *F16L 59/065* (2013.01); *H01J 7/18* (2013.01); *H01J 9/385* (2013.01); *H01M 16/00* (2013.01)

(58) Field of Classification Search
CPC ...... C25D 17/001; C25D 17/00; C25D 17/10; C25C 7/00; C25C 7/06; C25C 7/02; C25C 3/08; C25B 9/06; C25B 15/02
See application file for complete search history.

(56) References Cited

U.S. PATENT DOCUMENTS

| 5,006,428 A | 4/1991 | Goebel et al. |
| 5,578,189 A | 11/1996 | Joshi |

(Continued)

FOREIGN PATENT DOCUMENTS

EP        0633420        1/1995

*Primary Examiner* — Zulmariam Mendez
(74) *Attorney, Agent, or Firm* — Tarolli, Sundheim, Covell & Tummino LLP (57) ABSTRACT

An apparatus for forming a vacuum in a sealed enclosure through an electrochemical reaction includes an electrochemical cell comprising a cathode and an anode supported on a solid electrolyte. The solid electrolyte is a Li-ion non-volatile electrolyte containing a dissolved metal salt. The cathode is constructed of a material with which lithium is known to form alloys. The anode is constructed of a lithium-ion containing material. The cell is operable to expose lithium metal on the cathode.

19 Claims, 10 Drawing Sheets

(51) Int. Cl.
*C25D 21/12* (2006.01)
*F04B 37/02* (2006.01)

(56) References Cited

U.S. PATENT DOCUMENTS

| | | |
|---|---|---|
| 6,171,368 B1 | 1/2001 | Maget et al. |
| 2006/0102489 A1 | 5/2006 | Kelly |
| 2011/0200868 A1 | 8/2011 | Klaassen |

ELECTROCHEMICAL METHOD AND APPARATUS FOR FORMING A VACUUM IN A SEALED ENCLOSURE

RELATED APPLICATIONS

This application is a divisional of U.S. application Ser. No. 14/505,525, filed on Oct. 3, 2014, which claims the benefit of U.S. Provisional Application Ser. No. 61/887,489, filed Oct. 7, 2013, the disclosure of which is hereby incorporated by reference in its entirety. This application also claims the benefit of U.S. Provisional Application Ser. No. 61/973,428, filed Apr. 1, 2014, the disclosure of which is hereby incorporated by reference in its entirety.

TECHNICAL FIELD

The invention relates generally to forming a vacuum in a sealed enclosure. More particularly, the invention relates to a system, method, and apparatus for forming a vacuum in a sealed enclosure through an electrochemical reaction.

BACKGROUND OF THE INVENTION

There are many scenarios in which it may be desirable to form a vacuum in a sealed enclosure. One such scenario involves the manufacture of vacuum insulated panels ("VIPs"). VIPs are a form of thermal insulation that provides an excellent level of thermal resistance (R-value) in a package that is very thin in comparison with the thickness of comparable conventional insulating materials (e.g., rolls and batts, loose-fill, rigid foam, and foam-in-place insulation). VIPs having a thickness of less than an inch can provide an R-value that would require several inches or even feet of traditional thermal insulation materials.

Because of these features, VIPs are attractive insulation alternatives in a wide range of applications where space and/or high thermal resistance is desired. Potential applications range from residential and commercial building construction, commercial and industrial furnace/refrigeration applications, medical storage and transport, residential appliances, etc. The high R-value, low thickness features of VIPs beneficially reduces the space considerations required for engineering these products and, for example, can lead to refrigerators with more storage, ovens with larger capacities, and medical supplies that can last longer in extreme field conditions.

VIPs include a gas-tight or nearly gas-tight enclosure, surrounding a rigid or semi-rigid core material, in which the air has been evacuated to form a vacuum. The VIP is typically constructed of overlying gas impermeable membrane panels that are sealed around their peripheries to define the enclosure. The core material is constructed of a highly porous material. The core material can have various material constructions and configurations. For example, the core material can be a panel of material (e.g., a sheet of glass fiber) positioned between the membranes or a bulk material (e.g., a loose fiber or foam) distributed evenly between the membranes. When the air is evacuated from the enclosure, the external pressure applied to the membranes compress the core which, in response, maintains some degree of spacing between the membranes. The porous core material provides the space between the membranes in which the vacuum is formed.

VIPs are costly in comparison to conventional forms of thermal insulation materials. One factor that lends to this cost differential is the high cost of manufacture of the VIPs. These manufacturing costs are driven not only by high material costs, but also by costly manufacturing equipment. The vacuum pumps traditionally used to evacuate air from the VIPs are costly pieces of equipment. Additionally, because the vacuum pumps require access to the VIP enclosure to draw the vacuum, maintaining and completing the seal between the membranes after the pump is removed requires additional equipment and cost.

SUMMARY OF THE INVENTION

The present invention relates to a system, method, and apparatus for forming a vacuum in a sealed enclosure through an electrochemical reaction.

According to one aspect, an apparatus for forming a vacuum in a sealed enclosure through an electrochemical reaction includes an electrochemical cell comprising a cathode and an anode supported on a solid electrolyte. The solid electrolyte is a non-volatile, Li-ion conducting electrolyte containing a dissolved Li salt, the cathode is constructed of a material with which lithium is known to form alloys, such as silicon or tin, and the anode is constructed of a lithium-ion containing material. The cell is operable to expose the lithium alloy cathode to the environment within the enclosure.

According to another aspect, the cathode can be constructed of at least one of nickel, copper, silicon, and tin. Other materials could also be used.

According to another aspect, the solid electrolyte can include a solid polymer electrolyte ("SPE").

According to another aspect, the SPE can include a lithium hexafluorophosphate ($LiPF_6$) solution in polyethylene oxide ("PEO").

According to another aspect, the anode can be constructed of a lithium alloy that preferably should not be exposed to the gas in the enclosure.

According to another aspect, the solid electrolyte can have a thin, flat, and elongated planar configuration, wherein the cathode and anode are deposited on in an interdigitated configuration.

According to another aspect, the electrochemical cell can have a construction capable of conforming to the shape of a portion of the enclosure.

According to another aspect, the apparatus includes a source of power, such as a battery, for powering the cell.

According to another aspect, the cathode can be constructed of a material that does not form alloys with lithium, such as copper or nickel, wherein the electrochemical cell when actuated deposits lithium metal from the solid electrolyte onto the cathode while the anode releases lithium ions into the solid electrolyte. The gases within the enclosure permeate solid electrolyte and react with the lithium metal on the cathode.

According to another aspect, the cathode can be constructed of a material that forms alloys with lithium, such as silicon and tin, wherein the cell is operable to cause lithium to intercalate in the cathode, causing the cathode to rupture and expose the lithium alloy to the gases in the enclosure.

According to another aspect, the solid electrolyte can be a solid polymer electrolyte ("SPE") including a Li-ion non-volatile electrolyte containing a dissolved metal salt.

According to another aspect, the anode can be constructed of a lithiated transition metal oxide, such as lithium cobalt oxide ($LiCoO_2$).

According to another aspect, the cathode can be constructed of a conducting material such as copper or nickel serving as a current collector coated with a layer of silicon or tin.

According to another aspect, the apparatus can include actuation means including sensors and electronics or circuitry that is adapted to activate the apparatus remotely from outside the enclosure.

According to another aspect, the actuation means can be adapted to monitor pressure in the enclosure and activate/deactivate the apparatus in response to pressure in the enclosure.

According to another aspect, the actuation means can be adapted for non-electronic manual or mechanical activation, which can include at least one of a rupturable member that, when destroyed, actuates the electronics or circuitry; a removable member that, when removed manually, actuates the electronics or circuitry; and a mechanism that is actuated magnetically to actuate the electronics or circuitry.

According to another aspect, the actuation means can include at least one of RF transducers, tags, interrogators, and receivers adapted to provide information regarding the apparatus and actuate the apparatus in response to an RF signal applied externally to the enclosure via a controller.

According to another aspect, the actuation means can include sealed electrical feedthroughs in the walls of the enclosure that provide for wired connections to the apparatus from outside the enclosure.

According to another aspect, the actuation means can include a wireless inductive charging power supply.

According to another aspect, a method for forming a vacuum in an enclosed structure can include providing an enclosure; providing an electrochemical cell with a cathode exposed to the gases in the enclosure; and activating the electrochemical cell to cause electrodeposition of a reactive metal on the cathode. Reactive metal on the cathode reacts with the gases in the enclosure to reduce the pressure in the enclosure.

According to another aspect, the step of providing an electrochemical cell can include providing a solid electrolyte; providing a cathode on the solid electrolyte, the cathode comprising a material with which lithium does not form alloys, such as nickel or copper; and providing an anode on the solid electrolyte. The anode can include a lithium-ion containing material, such as a lithium alloy or a lithiated transition metal oxide.

According to another aspect, a method for forming a vacuum in an enclosed structure can include operating an electrochemical cell to electrodeposit lithium onto an electrode (cathode); and reacting the lithium with non-noble gases in a sealed enclosure to consume those gases and thereby lower the pressure in the enclosure.

According to another aspect, a method for forming a vacuum in an enclosed structure can include providing an enclosure; providing an electrochemical cell with a cathode exposed to the gases in the enclosure; and activating the electrochemical cell to cause intercalation of a reactive metal into the cathode of the electrochemical cell. The intercalation of the reactive metal in the cathode causing the cathode to crack or fissure, which exposes the metal to the gases in the enclosure. The metal alloy reacts with the gases, thereby reducing the pressure in the enclosure.

According to another aspect, a method for forming a vacuum in an enclosed structure can include operating an electrochemical cell to form lithium alloys on a cathode through intercalation with the materials of the cathode; and reacting the lithium alloy with non-noble gases in a sealed enclosure to consume those gases and thereby lower the pressure in the enclosure. The method can also include rupturing the lithium alloy cathode through intercalation to further expose gases in the sealed enclosure to the lithium alloy.

BRIEF DESCRIPTION OF THE DRAWINGS

The foregoing and other features of the invention will become apparent to those skilled in the art to which the invention relates upon reading the following description with reference to the accompanying drawings, in which.

DESCRIPTION

The invention relates generally to forming a vacuum in a sealed enclosure. More particularly, the invention relates to a system, method, and apparatus for forming a vacuum in a sealed enclosure through an electrochemical reaction.

Figure 1:
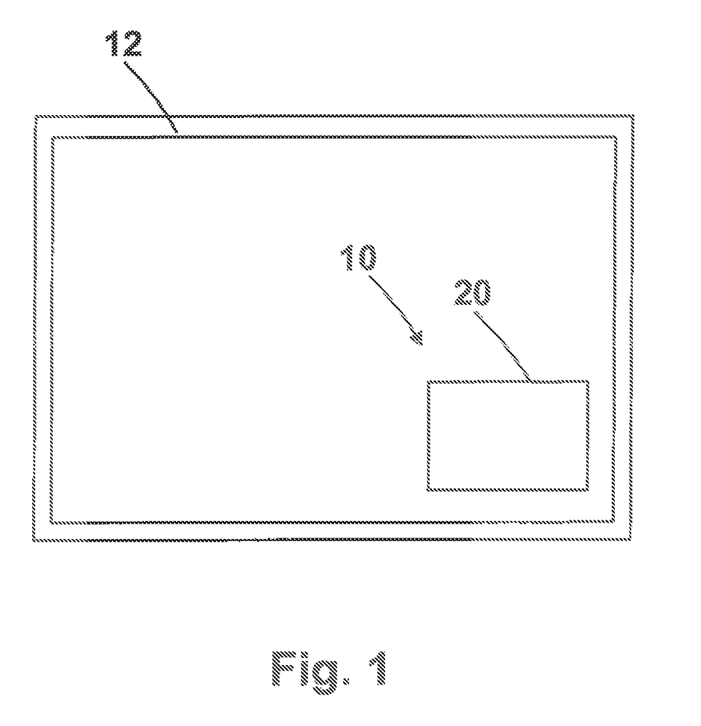
FIG. 1 illustrates a system for forming a vacuum in a sealed enclosure through an electrochemical reaction.
Figure 2:
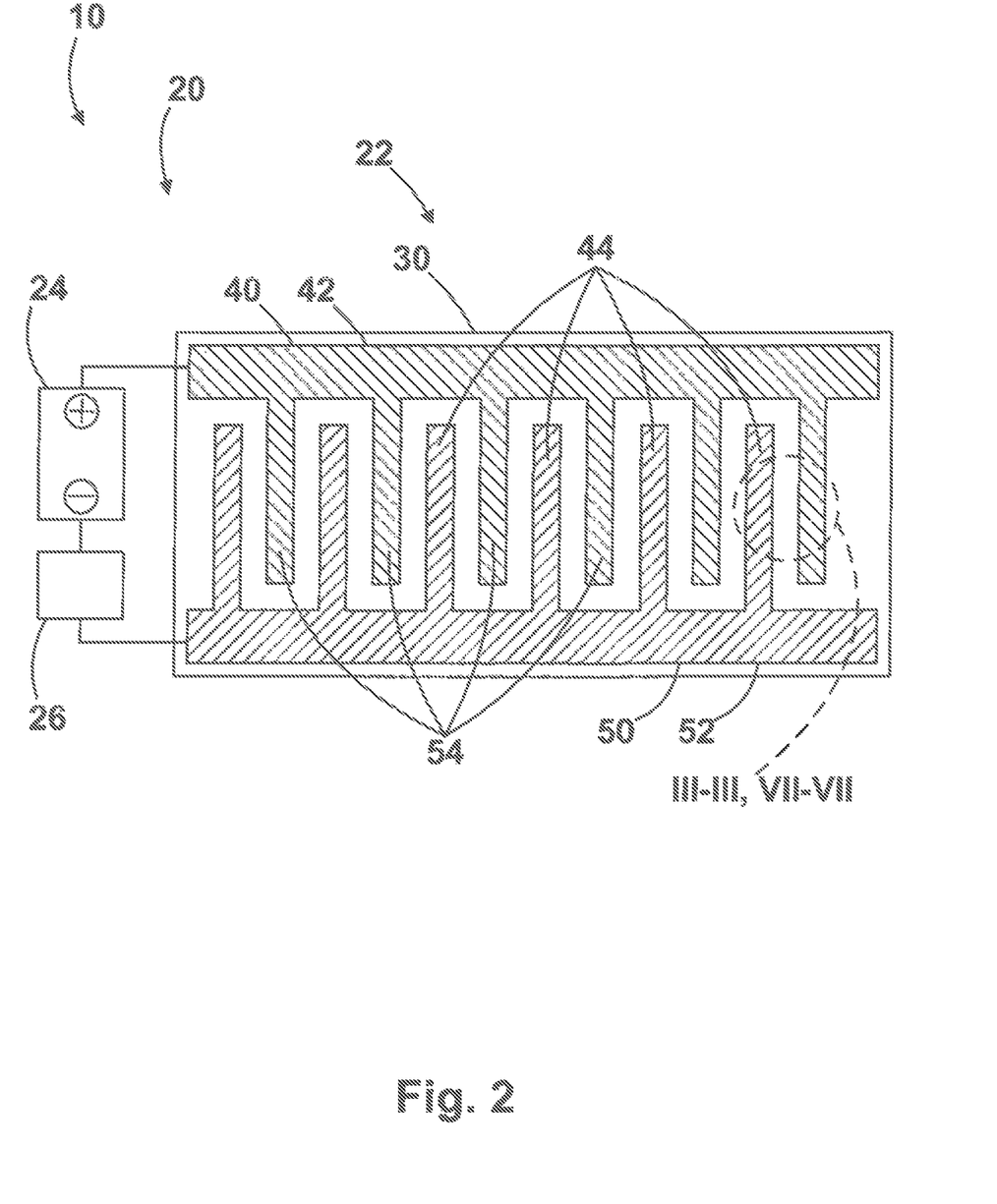
FIG. 2 illustrates a portion of the system of FIG. 1.

According to the invention, a system 10 includes an apparatus 20 for forming a vacuum in a sealed enclosure 12. Referring to FIG. 2, the apparatus 20 includes an electrochemical cell 22 and a power source 24, such as a lithium-ion battery, for supplying power to the cell. The enclosure 12 can be any enclosure in which a vacuum is to be created. Thus, the enclosure 12 is represented schematically in FIG. 1 with the understanding that the enclosure can have any desired shape and/or size. Additionally, the enclosure 12 can be constructed of any desired material as long as that material is compatible with the materials used to form the apparatus 20 and the processes in which the apparatus is used, as described herein.

Referring to FIG. 2, the electrochemical cell 20 includes a cathode 40 and an anode 50 supported on a solid electrolyte 30, such as a solid polymer electrolyte ("SPE") or a solid Li$^+$ conductive material such as LISICON and LIPON, the most common inorganic Li$^+$ conductors. In FIG. 2, the SPE 30 is a lithium-ion ("Li-ion") conductor polymer. The electrochemical cell 20 thus has a solid-state construction. The electrochemical cell 20 either: a) does not include a casing, or b) includes a casing that permits contact between the cell and the environment of the enclosed structure 12.

The SPE 30 is formed of a non-volatile polymer electrolyte material. For example, the SPE 30 could be a Li-ion non-volatile polymer electrolyte material. In one such example, the SPE 30 can be an electrolyte containing a dissolved metal salt, such as a lithium hexafluorophosphate (LiPF$_6$) solution in polyethylene oxide ("PEO"). The electrochemical cell 20 can thus have a solid state construction.

Alternatively, the SPE 30 can include nanoparticles of alumina or silica, which are known to increase lithium ion conductivity. The SPE 30 can also include non-volatile ionic liquids, such as those based on imidazolium ions, which are also known to increase lithium ion conductivity. One particular example of such a liquid is 1-ethyl-3-methylimidazolium trifluoromethanesulfonate (EMITf).

The solid electrolyte 30 used in the electrochemical cell 20 is not limited to a solid polymer electrolyte construction. The solid electrolyte could, for example, be a mixture of inorganic polymers or could be two layers—an inorganic and a polymer. These configurations can protect the anode material that is not stable by itself toward reaction with gases, such as alloys or low voltage lithium compounds (e.g., lithium titanium oxide "LTO"), which require a much lower voltage to run/charge. The solid electrolyte 30 could also be a mixture of polymers and ionic liquids where both display negligible vapor pressure.

As a further alternative, the electrochemical cell 20 could include an inert separator, such as commercial polyethylene ("PE") or polypropylene ("PP") separators, that mechanically supports the electrolyte in its pores. This can be beneficial, for example, in the case where the polymer or mixture is too weak to support the electrodes or to support rolling, folding, or otherwise shaping the cell 20 in the desired manner.

The cathode 40 can be made of materials such as nickel (Ni) or copper (Cu), with which lithium does not form alloys at room temperature; of silicon (Si) or tin (Sn), with which lithium is known to form alloys under room temperature conditions; or of carbons, into which Li-ion is known to intercalate. The cathode can incorporate the use of a current collector made out of Cu or Ni onto which silicon and tin can be deposited either as films or in the form of small particles supported on a highly conducting material such as carbon using a non volatile polymeric binder.

The anode 50 includes a material capable of donating reactive metal ions to the SPE. Examples of such metals are group I metals, such as lithium (Li), sodium (Na), potassium (K), rubidium (Rb), and cesium (Cs). Lithium, however, is the metal best suited for the applications disclosed herein and is therefore preferred. Therefore, the anode 50 could include metallic lithium and any material that contains Li and can lose Li-ions without gas emission, which might be protected by a gas impermeable electrolyte layer preferably inorganic and thus chemically less reactive. For example, the anode 50 can be made of $Li^+$ containing material, such as a Li alloy or a lithiated transition metal oxide, such as lithium cobalt oxide ($LiCoO_2$).

Lithium, while preferred, is not the only possible reactive metal. For instance, NASICON (a sodium ionic super conductor material) is a good $Na^+$ ion conductor that could be used for the solid electrolyte 30. To use this material as an electrolyte, the anode and cathode materials would have to be formed from matched materials that use Na as the active metal.

This description of the invention illustrates and describes embodiments that utilize lithium as the reactive metal in the electrochemical cell. While lithium is the preferred metal, this description is not meant to be limiting, as those skilled in the art will appreciate that other reactive metals (e.g., those listed above) could potentially be used in the construction of the apparatus 20 and thereby to carry out the reactions and processes described herein.

In the embodiment illustrated in FIG. 2, the SPE 30 has a thin, flat, and elongated planar configuration. The cathode 40 and anode 50 are deposited on the SPE 30. The cathode 40 includes a bus portion 42 that extends along a longitudinal edge of the SPE 30. The cathode 40 also includes a plurality of tabs or fingers 44 spaced along its length and extending transversely from the bus portion 42 in a generally downward direction as viewed in FIG. 2. The anode 50 includes a bus portion 52 that extends along a longitudinal edge of the SPE 30 opposite the bus portion 42. The anode 50 also includes a plurality of tabs or fingers 54 spaced along its length and extending transversely from the bus portion 52 in a generally upward direction as viewed in FIG. 2. The fingers 44, 54 of the cathode 40 and anode 50 are arranged in an alternating and interlocking manner referred to herein and in the art as "interdigitated." This repeating, interdigitated configuration allows the apparatus to have any desired length.

The SPE 30, cathode 40, and anode 50 can be extremely thin, e.g., in the range of several hundredths or thousandths of an inch thick. The electrochemical cell 20 can thus have a correspondingly thin construction. The SPE 30, cathode 40, anode 50, and, thus, the apparatus 20, can, of course, be thicker. Advantageously, this thin, elongated, planar configuration, in combination with its material construction, allows the electrochemical cell 20 to be bent, rolled, folded, and otherwise manipulated to assume a desired shape, configuration, or form. For example, the electrochemical cell 20, having this construction, can be made to conform to the shape of a portion of the enclosure 12 (see FIG. 1) in which it is implemented.

The thin film electrochemical cell construction illustrated in FIG. 2 is but one illustrative example construction of the cell. The electrochemical cell 20 could have configurations/constructions alternative to the thin film configuration described above. For example, the electrochemical cell 20 can have other film configurations or could be constructed in the form of a pellet, cylinder, block, or any other desired configuration having electrodes and electrolyte arranged in a manner that is consistent with the operation described herein.

According to the invention, the electrochemical cell 20 is adapted to consume the gases, i.e., air or its gaseous non-noble constituents, within the enclosure 12 through an electrochemical reaction, via one or more chemical reactions with electrochemically generated lithium, or chemical reactions between the products of these reactions and atmospheric components It is this consumption of the gas within the sealed enclosure 12 that forms the vacuum. The electrochemical cell 20 lowers the pressure within the enclosure 12 through an electrochemical reaction that takes place when a voltage is applied to the cell by the source 24. Operation of the apparatus 20 can also be achieved by controlling the current supplied to the electrochemical cell 20 by the power source 24.

Figure 3:
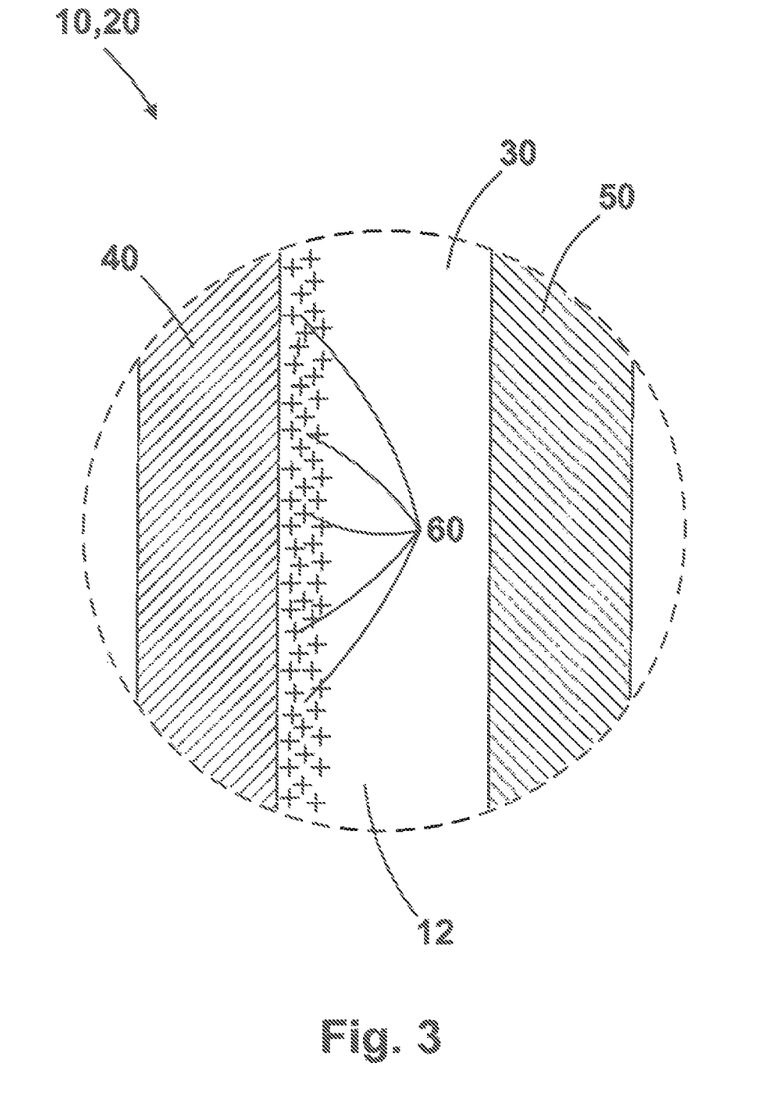
FIG. 3 illustrates portion of the system indicated generally at III-III in FIG. 2, according a first embodiment of the invention.

FIG. 3 illustrates the operation of the electrochemical cell 20 in accordance with a first embodiment of the invention. In this embodiment, the cathode 40 is formed of a material that does not form alloys with lithium, such as nickel or copper. Because of this construction, the electrochemical reaction that takes place during operation of the electrochemical cell 20 results in the electrodeposition of the Li metal from the lithium-ion SPE 30 onto the cathode 40, while the anode 50 releases $Li^+$ ions into the SPE. The electrochemical cell 20, being in contact with the environment within the enclosure 12, allows the gases within the enclosure to permeate through the SPE 30 and thus react with the electrodeposited Li metal and/or its alloys on the cathode 40. Since metallic Li electrodeposits are often dendritic in shape, dendrites 60 formed on the cathode have large specific areas that are exposed to the environment within the enclosure and thus provide optimum conditions for promoting reactions with the gases in the enclosure 12.

The reactions between metallic Li and the gases within the enclosure would include:

$$6Li+N_2 \rightarrow 2Li_3N;$$

$$4Li+O_2 \rightarrow 2Li_2O;$$

$$2Li+H_2O \rightarrow LiOH+LiH$$

$$Li_2O+H_2O \rightarrow 2LiOH$$

$$4Li+O_2+2H_2O \rightarrow 4LiOH$$

The amount of lithium available for electrodeposition on the cathode 40 is determined primarily on the amount of $Li^+$ ion contained within the anode 50 which, advantageously, can be selected to be equal to or greater than the amount required to react with the entire volume of gas present within the enclosure 12. Alternatively, the amount of $Li^+$ ion contained within the anode 50 can be selected to react with a desired amount or portion of the volume of gas present within the enclosure 12 in order to achieve a desired pressure reduction in the enclosure 12. Additionally, the amount of lithium can be selected to leave some left unconsumed after the initial vacuum formation. Advantageously, this excess lithium can consume gases that subsequently enter the enclosure due to leakage.

Figure 4:
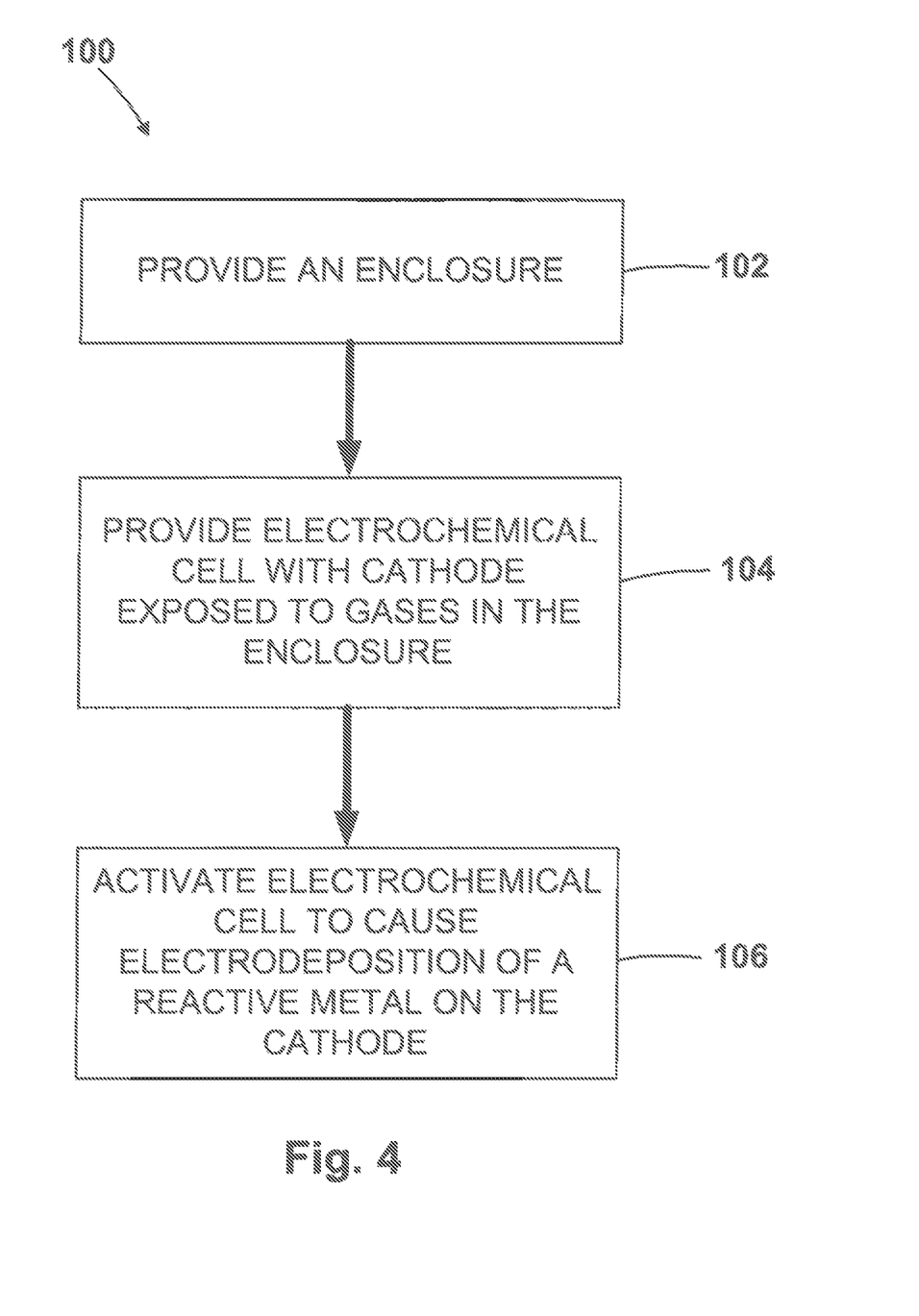
FIGS. 4-6 illustrate processes performed by the system in accordance with the first embodiment.

From the above, and referring now to FIG. 4, it will be appreciated that the system 10 and apparatus 20, having the construction and operation described with reference to FIG. 3, performs a method 100 for forming a vacuum in an enclosed structure. The method 100 includes the step 102 of providing an enclosure, and the step 104 of providing an electrochemical cell with a cathode exposed to the gases in the enclosure. The method 100 further includes the step 106 of activating the electrochemical cell to cause electrodeposition of a reactive metal on the cathode. The reactive metal on the cathode reacts with the gases in the enclosure to reduce the pressure in the enclosure, thus forming a vacuum therein.

Figure 5:
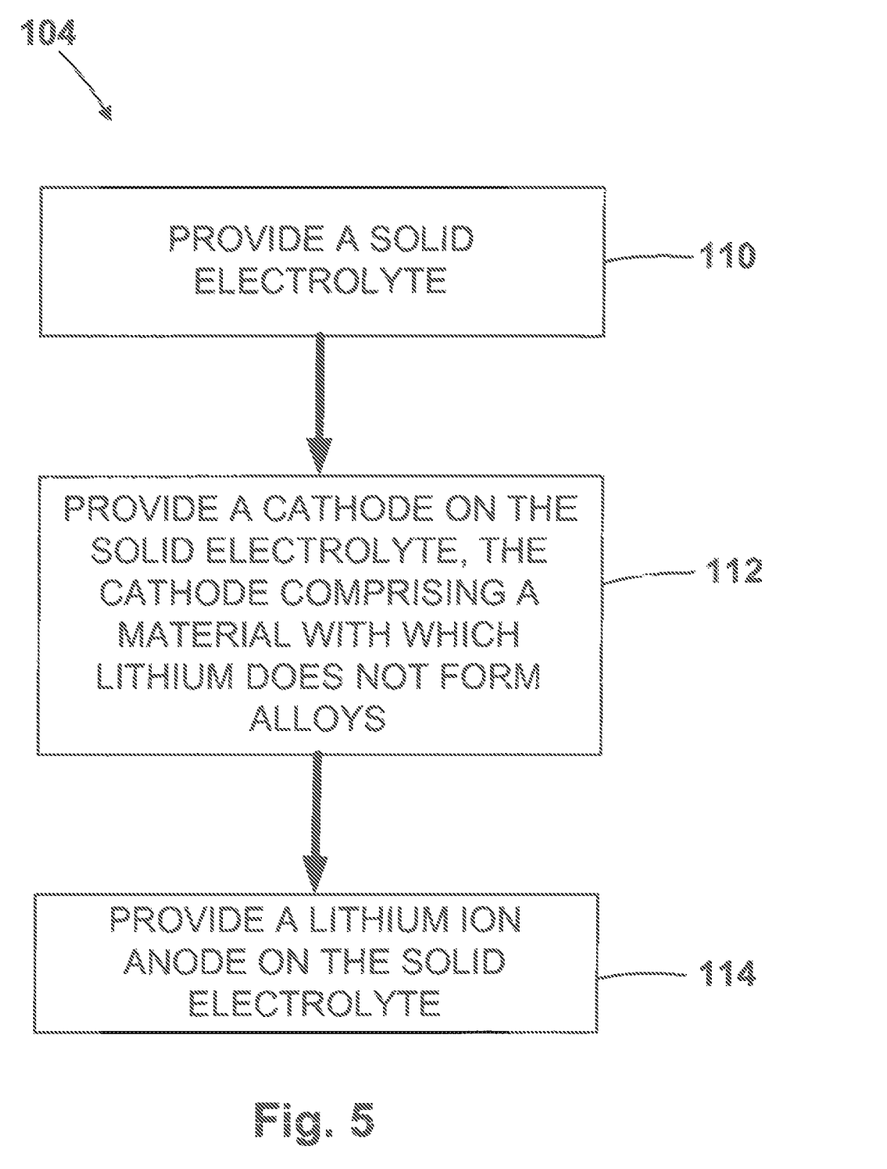

Referring to FIG. 5, the step 104 of providing an electrochemical cell includes the step 110 of providing a solid polymer electrolyte ("SPE"). The step 104 also includes the step 112 of providing a cathode on the SPE, the cathode comprising a material with which lithium does not alloy, such as nickel or copper. The step 104 also includes the step 114 of providing a lithium ion anode on the SPE (e.g., a lithium alloy anode or a lithiated transition metal oxide anode).

Figure 6:
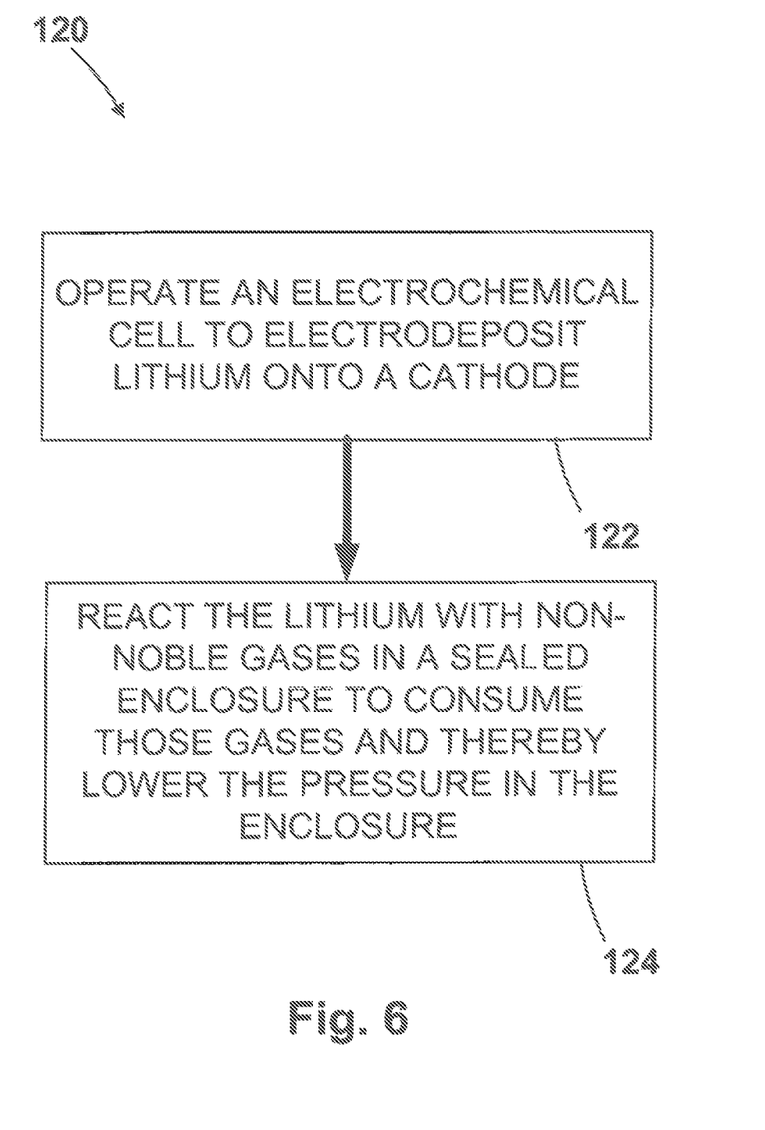

In another aspect, referring now to FIG. 6, the system 10 and apparatus 20 having the construction and operation described with reference to FIG. 3, performs a method 120 for forming a vacuum in an enclosed structure. The method 120 includes the step 122 of operating an electrochemical cell to electrodeposit lithium onto an electrode (cathode). The method 120 also includes the step 124 of reacting the lithium with non-noble gases in a sealed enclosure to consume those gases and thereby lower the pressure in the enclosure.

Figure 7:
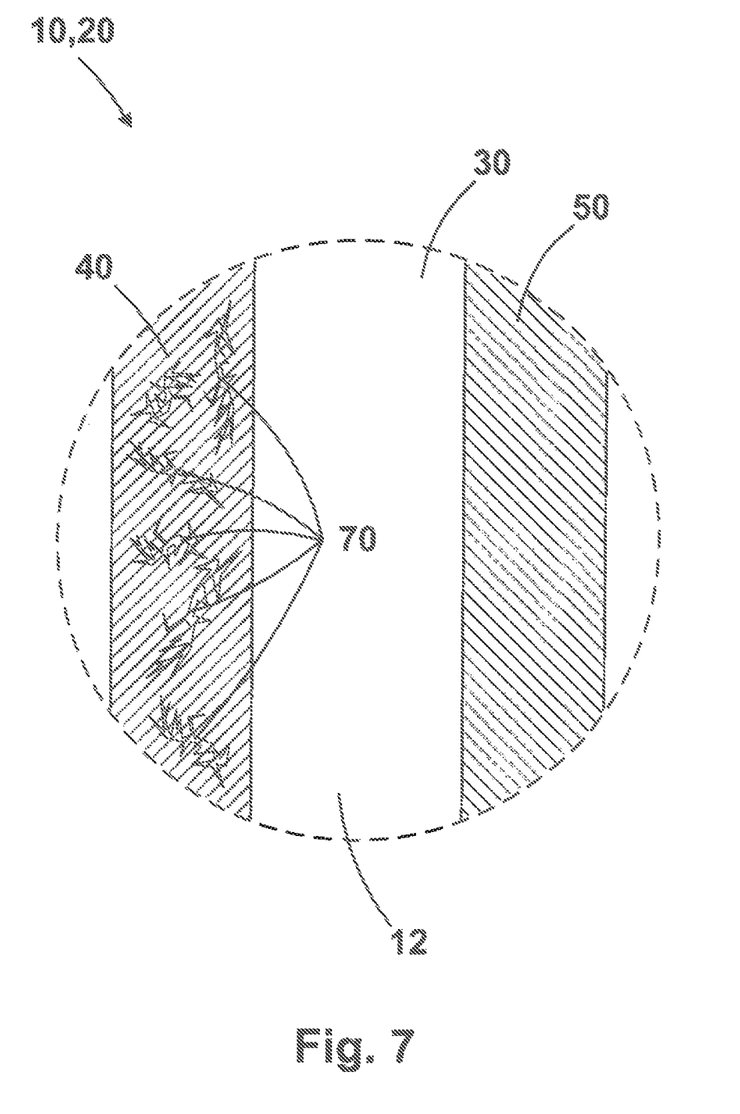
FIG. 7 illustrates portion of the system indicated generally at VII-VII in FIG. 2, according to a second embodiment of the invention.

FIG. 7 illustrates the operation of the electrochemical cell 20 in accordance with a second embodiment of the invention. In this embodiment, the cathode 40 is formed of a material that forms alloys with lithium, such as silicon or tin. Because of this construction, the electrochemical reaction that takes place during operation of the electrochemical cell 20 differs from that shown and described with reference to FIG. 3.

In the embodiment of FIG. 7, the lithium reaction with silicon is an alloying reaction that results in the formation of a lithium alloy. The reaction starts at the surface and destroys the crystal structure (lattice) of the host material, i.e., Si or Sn. Alternatively, depending on the materials used to form the cathode, instead of alloying, the lithium could intercalate into an activated cathode material, forming LiC6 (lithium in graphite). In either case, the lithium alloy/intercalated lithium reacts with and consumes the gases in the enclosure 12, which reduces the pressure in the enclosure.

Again, as with the first embodiment, the reactions between the lithium in the lithium alloy/intercalated lithium and the gases within the enclosure would include (where the alloying element has been omitted for clarity):

$$6Li+N_2 \rightarrow 2Li_3N;$$

$$4Li+O_2 \rightarrow 2Li_2O;$$

$$2Li+H_2O \rightarrow LiOH+LiH$$

$$Li_2O+H_2O \rightarrow 2LiOH$$

$$4Li+O_2+2H_2O \rightarrow 4LiOH$$

Similarly, the amount of lithium available for alloying with the cathode 40 is determined primarily on the amount of $Li^+$ ion contained within the anode 50 which, advantageously, can be selected to be equal to or greater than the amount required to react with the entire volume of gas present within the enclosure 12. Alternatively, the amount of Li ion contained within the anode 50 can be selected to react with a desired amount or portion of the volume of gas present within the enclosure 12 in order to achieve a desired pressure reduction in the enclosure 12. Additionally, the amount of lithium can be selected to leave some left unconsumed after the initial vacuum formation. Advantageously, this excess lithium can consume gases that subsequently enter the enclosure due to leakage.

In this embodiment, the cathode 40 could be constructed of an electrically conductive mesh material (e.g., Cu or Ni) onto which silicon or tin can be deposited as films or in the form of small particles supported on a highly conductive material, such as carbon, using a non-volatile polymeric binder. This construction would improve the current conducting properties of the cathode 40.

Intercalation of lithium into the cathode 40 causes the volume of the cathode 40 to increase, which can result in mechanical stresses that lead the cathode structure to crack, fissure, or otherwise rupture. This possibility is shown in FIG. 7. Referring to FIG. 7, these cracks/fissures 70 could be advantageous in that they could further expose the lithium alloy contained in the cathode 40 to the gases in the enclosure 12 and furthers the reaction with those gases.

Figure 8:
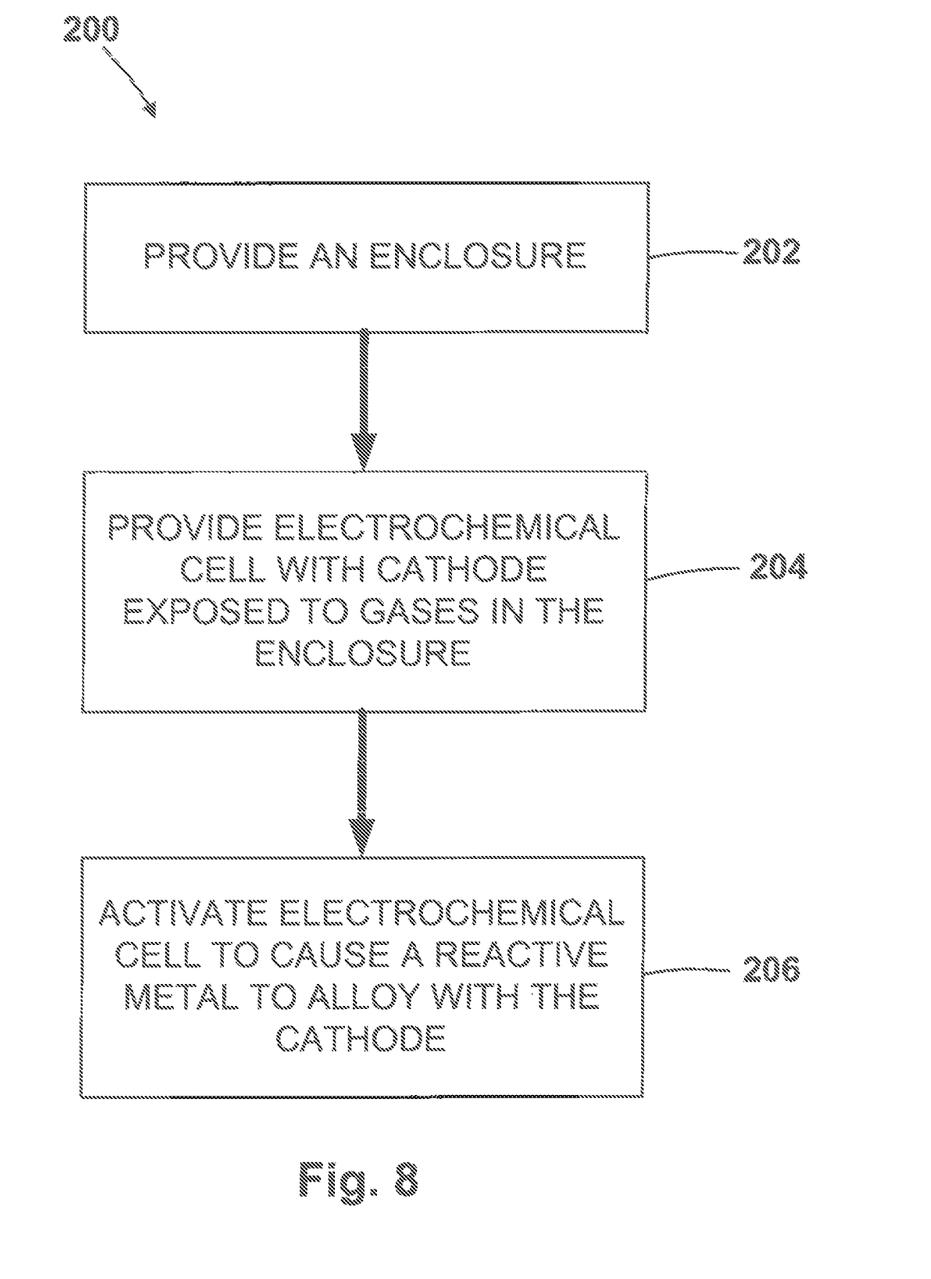
FIGS. 8-9 illustrate processes performed by the system in accordance with the second embodiment.

From the above, and referring now to FIG. 8, it will be appreciated that the system 10 and apparatus 20 of the second embodiment shown and described in reference to FIG. 7 are used to perform a method 200 for forming a vacuum in an enclosed structure. The method 200 includes the step 202 of providing an enclosure, and the step 204 of providing an electrochemical cell with a cathode exposed to the gases in the enclosure. The method 200 further includes the step 206 of activating the electrochemical cell to cause a reactive metal to alloy with the cathode of the electrochemical cell. This alloy reacts with the gases in the enclosure.

Figure 9:
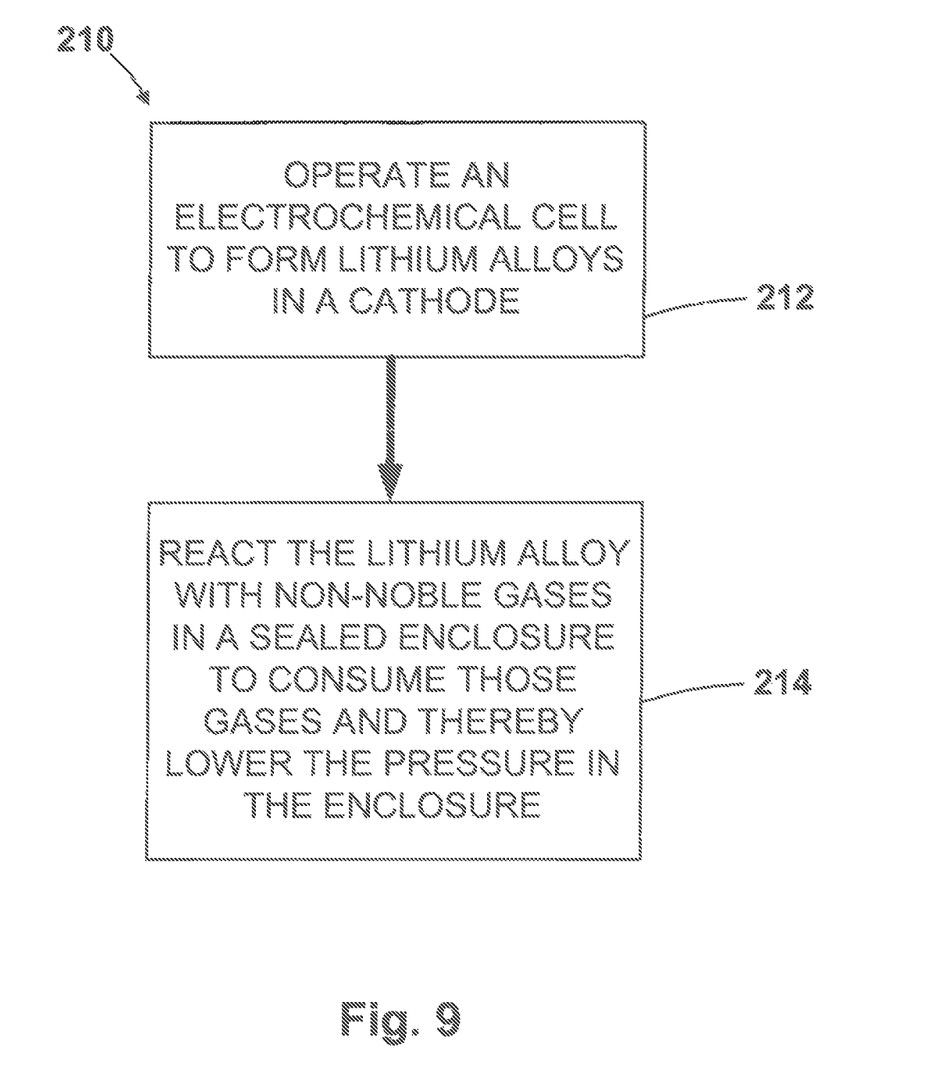

Referring to FIG. 9, it will be appreciated that the system 10 and apparatus 20 of the second embodiment are also used to perform a method 210 for forming a vacuum in an enclosed structure. The method 210 includes the step 212 of operating an electrochemical cell to form lithium alloys on a cathode. The method 210 also includes the step 214 of reacting the lithium alloy with non-noble gases in a sealed enclosure to consume those gases and thereby lower the pressure in the enclosure.

From the above, those skilled in the art will appreciate that the apparatus 20 allows for the formation of a vacuum in the enclosure without requiring the use of the pumps and other equipment traditionally associated with vacuum formation. The electrochemical cell 22 is operable to consume the non-noble gases in the enclosure 12 to form the vacuum. Thereafter, the electrochemical cell 22 can be used to maintain the vacuum in the enclosure by reacting with leaked gases. Since the total amount of Li in the anode 50 will control the amount of gas the apparatus 20 is capable of removing, its size can be selected accordingly.

Depending on the materials used to construct the electrochemical cell 20, the cell may require the addition of certain components to facilitate its operation. For example, in order to raise the ionic conductivity of solutions of a Li salt in PEO, the temperature of the PEO may be raised up to several tens of degrees centigrade. To accomplish this, the cell may include a heater. Once the system begins to work and the pumping action starts, the ability of the heater to heat up the thin battery will increase as there will be no source of heat dissipation except through the wires that connect the thin battery to the outside world. The latter would be avoided by having the battery internal to the enclosure and well isolated thermally.

The sealed enclosure 12 is formed with the apparatus 20 disposed therein. The apparatus 20 is inert until activated from outside the enclosure 12 to form the vacuum. To accomplish this, the apparatus 20 can include actuation means 26, which is illustrated schematically because it can take on various forms. For example, the actuation means 26 can include electronics or circuitry that is adapted to activate the apparatus remotely and/or wirelessly. Advantageously, the electronics/circuitry of the actuation means 26 can deactivate the apparatus 20 and subsequently reactivate the apparatus when the pressure in the enclosure 12 increases due, for example, to gassing through the enclosure. To this end, the electronics/circuitry of the actuation means 26 can be adapted to monitor the pressure within the enclosure 12.

As another example, the actuation means 26 can be configured for non-electronic manual or mechanical activation. This can be advantageous, for instance, in implementations where cost is a concern. In this implementation, the actuation means 26 can include, for example, a rupturable member that, when destroyed, completes the circuit between the source 24 and the electrochemical cell 22. Alternatively, the actuation means 26 can be a removable member that, when removed manually, completes the circuit between the source 24 and the electrochemical cell 22. This can, for example, be a removable strip or tape that insulates the source 24 from the electrochemical cell 22. As a further alternative, the actuation means can be a mechanism that is actuated magnetically to complete the circuit between the source 24 and the electrochemical cell 22. This can be achieved, for example, in a manner similar to that used to secure/release magnetic security tags commonly found in department stores and the like.

In yet another example, the actuation means 26 can incorporate the use of radiofrequency ("RF") transducers/tags and interrogators/receivers. For instance, the actuation means 26 can include an RF tag/switch that allows the electrochemical cell 22 to be activated/deactivated via an RF interrogator/receiver. The actuation means 26 can also include an RF transducer that will return an indication that a certain (high) pressure has been attained in the enclosure when interrogated with the same RF interrogator/receiver. Thus, once the desired vacuum is achieved in the enclosure 12, the electrochemical cell 22 can be deactivated remotely via RF control. Thereafter, the pressure in the enclosure 12 can be monitored periodically and, when it reaches the predetermined level, the electrochemical cell 22 can be reactivated via RF control.

In a further example, the power supply 24 could be external to the enclosure 12, and fed to the electrochemical cell 22 via sealed electrical feedthroughs in the walls of the enclosure 12, e.g., sockets or pins, that allow fully controlled operation of the apparatus external to the enclosure.

As yet another example, the power supply 24 and/or actuation means 26 could include a wireless inductive charging power supply that uses an electromagnetic field to transfer energy from a charging unit outside the enclosure 12 to the electronics in the enclosure. In this instance, a charging unit with an inductive transmitting coil would generate an electromagnetic field that excites an inductive receiving coil component of the power supply 24 in the enclosure. These coils cooperate to form an inductive coupling for powering or charging the electrochemical cell 20.

Figure 10:
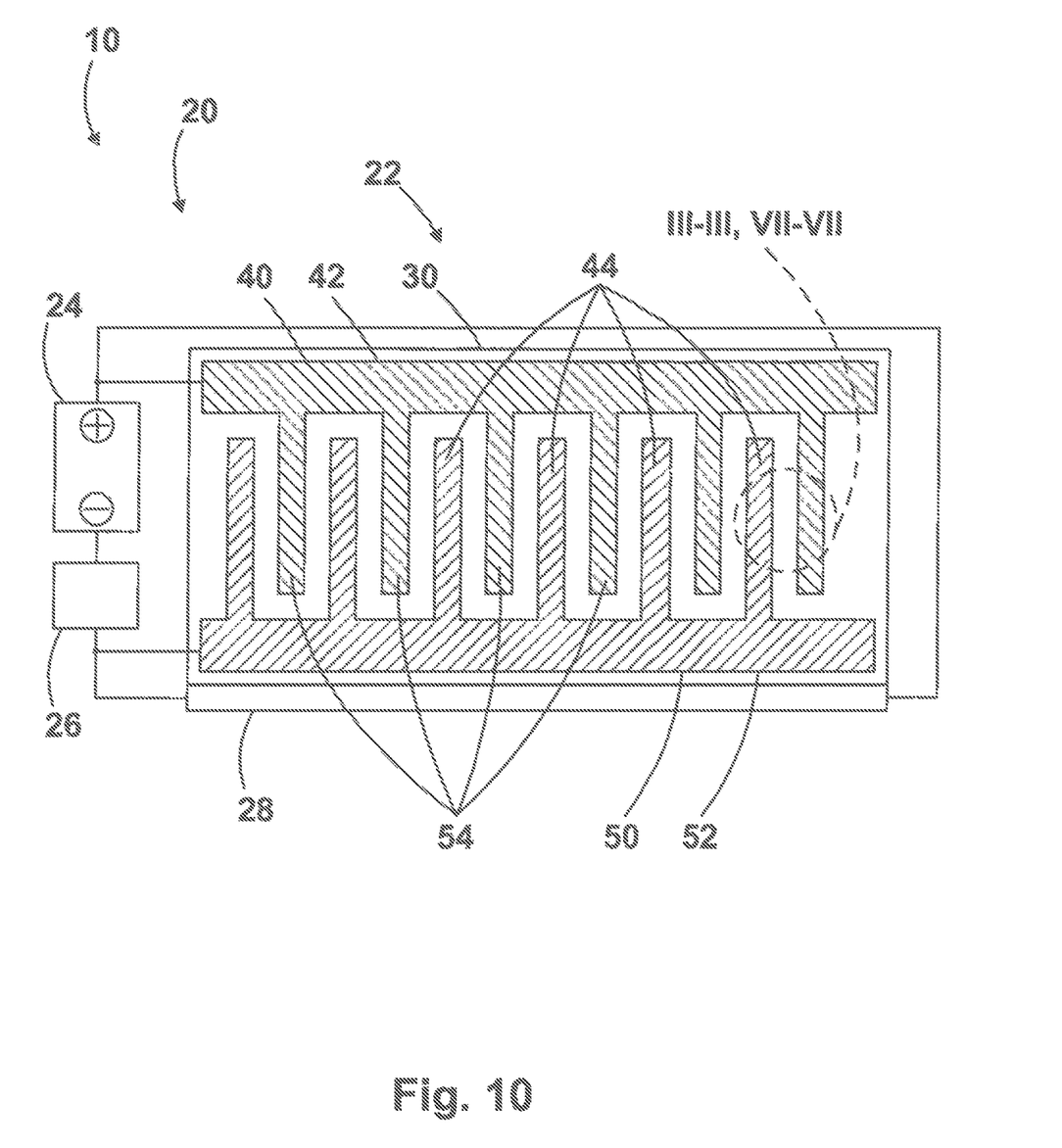
FIG. 10 illustrates a portion of the system of FIG. 1, according to another embodiment.

According to another aspect of the invention, the apparatus 20 can include a heater 28 for heating the electrochemical cell 22 within the enclosure 12. This is shown in FIG. 10. The apparatus 20 shown in FIG. 10 is identical to the apparatus shown in and described with reference to FIGS. 1-9, with the heater 28 being added to the embodiment of FIG. 10. The heater 28 can have any configuration consistent with the description of the invention set forth herein. For example, the heater 28 can be a simple resistive heating element that is an integral portion of the apparatus 20 located within the enclosure 12. Alternatively, the heater could be an electromagnetic radiation (e.g., microwave) heat source located outside the enclosure 12.

In the example configuration illustrated in FIG. 10, the heater 28 is connected to and powered by the power source 24. The heater 28 could, however, be powered via an alternative source, such as a magnetic field power source that powers the heater via induction. As a matter of convenience and economy, the manner in which the heater 28 is powered and operated can be selected to coincide with the manner in which the electrochemical cell 22 is powered and operated. Thus, as shown in FIG. 10, the apparatus 20 can be configured so that both the electrochemical cell 22 and the heater 28 are powered by the power source 24 and actuated by the actuation means 26.

In operation, the heater 28 functions to raise the temperature of the electrochemical cell 22 during operation. The heater 28 can be configured and arranged to have the ability to raise the temperature of the electrochemical cell 22 in the order of tens of degrees centigrade or more. Since temperature affects the rates of metal deposition and the microstructure of electrodeposits, the ability to control the temperature of the electrochemical cell 22 can allow for controlling the rates of the resulting reactions. It therefore follows that including the heater 28 and implementing the ability to control its function allows for tailoring the operation of the electrochemical cell 22 in order to produce desired results, i.e., desired rates and degrees of vacuum formation.

From the description set forth herein, those skilled in the art will appreciate that the system, method, and apparatus of the invention relates to the concept of electrochemically producing a material, either an element, alloy, or chemical compound, that will react with atmospheric components for the purpose of creating a vacuum within an enclosure. The electricity for producing this electrochemical reaction can be supplied by any suitable source, such as a battery, capacitor, fuel cell or any other device capable of generating electricity. In certain implementations, the electricity could be supplied via a power supply connected by cord or cable to an electrical outlet.

The materials produced through the chemical reaction can be the alkali metals described above (e.g., lithium) and can also include alkaline earth metals, such as magnesium. In this case, metallic magnesium could be electroplated on a metallic grid or foam electrode using a magnesium salt dissolved in polyethylene oxide incorporating a non volatile ionic liquid as the electrolyte (see, for example, Kumar et al. Electrochimica Acta 56 (2011) 3864-3873), and a cathode containing, for example, nanoscale Chevrel $Mo_6S_8$ in powder form (see, for example, Ryu, A.; Park, M. S.; Cho, W.; et al. Bulletin of the Korean Chemical Society 34, 3033-3038 (2013) or one of many other materials known to intercalate magnesium ion (see, for example, Gershinsky, G.; Yoo, Hyun D.; Gofer, Y.; et al. Langmuir 29, 10964-10972 (2013)).

In the case of magnesium, the reactions between the magnesium alloy and the gases within the enclosure would include (where the alloying element has been omitted for clarity):

$$3Mg+N_2 \rightarrow Mg_3N_2;$$

$$2Mg+O_2 \rightarrow 2MgO;$$

$$MgO+H_2O \rightarrow Mg(OH)_2$$

-or- $$2Mg+O_2+2H_2O \rightarrow 2Mg(OH)_2$$

Transition metals can also be used. Examples of these are manganese, iron, cobalt, nickel, copper, and zinc. Other transition metals can be used, although their uses may be cost prohibitive. Additionally, rare earth elements (i.e., the lanthanides plus scandium and yttrium) can also be used.

These transition metals can include nanoparticles or nanodomains of manganese, iron, cobalt, nickel, copper, and zinc which can be generated by the electrochemically induced conversion of salts, such as fluorides, oxides, or sulfides of these metals in the presence of lithium ions in the electrolyte which would produce the corresponding lithium salts according to the generalized reaction:

$$MX_n + nLi^+ + ne^- \rightarrow nLiX + M;$$

where M represents a transition metal (e.g., Mn, Fe, Co, Ni, Cu, or Zn), X represents oxygen, sulfur, or fluorine, n represents the subscript appropriate for the compound or the proper coefficient for balancing the reaction.

In one particular example, nanometric forms of metallic iron readily reacts with oxygen to form iron oxides in an irreversible fashion. In this instance, the above equation would be:

$$4Fe+3O_2=2Fe_2O_3$$

Advantageously, this construction can be found in battery applications as a means for storing energy. Using such a battery as the power source 24 for the electrochemical cell 22 in the sealed enclosure 20 (see FIG. 1) would therefore advantageously remove oxygen from the enclosure while simultaneously powering the cell to remove other gases. In this example, care would have to be exercised so that the oxygen in the enclosure is not completely consumed prior to consuming the other consumable gases. Alternatively, the enclosure 20 could be flushed with oxygen prior to its being sealed and the battery could be activated therein in a simple circuit with a resistive load.

In fact, this approach could be used with any of the electrochemical cells described herein, and could be used with inexpensive gases in addition to or other than oxygen, such as carbon dioxide. The gases could be introduced during construction of the enclosure, prior to its being sealed. When the enclosure is filled with the gas, it can be sealed with the electrochemical cell and power source installed therein. Once the cell/power source is activated, the gas will be consumed through the reactions described herein. Advantageously, this can avoid leaving noble gases, such as argon, in the enclosure. Since noble gases will not react with the metals in the electrochemical cell, they cannot be removed electrochemically. Removing noble gases such as argon prior to sealing the enclosure solves this and, in doing so, allows the electrochemical reaction to form a more complete vacuum.

As a further alternative, a water aspirator or a mechanical pump could be used to reduce the pressure in the sealed enclosure prior to activating the electrochemical cell. This would serve to reduce the pressure in the enclosure and therefore reduce the size of the electrochemical cell required to achieve the desired level of vacuum in the enclosure.

From the above description of the invention, those skilled in the art will perceive improvements, changes and modifications. These and other such improvements, changes and modifications within the skill of the art are intended to be covered by the appended claims.

Having described the invention, the following is claimed:

1. An apparatus for consuming gases, comprising:
an electrochemical cell comprising a cathode and an anode supported on a solid electrolyte;
a power supply connected to the electrochemical cell;
an actuator connected to the power supply;
wherein the actuator is operable to cause the power supply to provide power to operate the electrochemical cell;
wherein the electrochemical cell when operated causes the electrodeposition of a reactive metal on the cathode; and
wherein the cathode is exposed to the gases so that the reactive metal can react with and consume the gases.

2. The apparatus recited in claim 1, wherein:
the solid electrolyte comprises a Li-ion non-volatile electrolyte containing a dissolved metal salt;
the cathode is constructed of a material onto which lithium can be deposited;
the anode is constructed of a lithium or lithium-ion containing material; and
wherein the cell is operable to expose lithium metal on the cathode.

3. The apparatus recited in claim 1, wherein the solid electrolyte comprises a solid polymer electrolyte ("SPE").

4. The apparatus recited in claim 3, wherein the SPE comprises a lithium hexafluorophosphate ($LiPF_6$) solution in polyethylene oxide ("PEO").

5. The apparatus recited in claim 1, wherein the cathode is constructed of at least one of nickel, copper, silicon, and tin.

6. The apparatus recited in claim 1, wherein the anode is constructed of a lithium alloy.

7. The apparatus recited in claim 1, wherein the solid electrolyte has a thin, flat, and elongated planar configuration, wherein the cathode and anode are deposited on the in an interdigitated configuration.

8. The apparatus recited in claim 1, wherein the cathode is constructed of a material that does not form alloys with lithium, such as copper or nickel, wherein the electrochemical cell when operated deposits lithium metal from the solid electrolyte onto the cathode while the anode releases lithium ions into the solid electrolyte, and wherein the gases permeate the solid electrolyte and react with the lithium metal on the cathode.

9. The apparatus recited in claim 1, wherein the cathode is constructed of a material that forms alloys with lithium, such as silicon and tin, and wherein the electrochemical cell when operated causes lithium to intercalate in the cathode, causing the cathode to rupture and expose the lithium alloy to the gases.

10. The apparatus recited in claim 9, wherein the solid electrolyte comprises a solid polymer electrolyte ("SPE") comprising a Li-ion non-volatile electrolyte containing a dissolved metal salt.

11. The apparatus recited in claim 9, wherein the anode is constructed of a lithiated transition metal oxide, such as lithium cobalt oxide ($LiCoO_2$).

12. The apparatus recited in claim 9, wherein the cathode is constructed of a mesh material coated with a layer of silicon or tin.

13. The apparatus recited in claim 1, wherein the actuator is configured to be actuated remotely.

14. The apparatus recited in claim 1, wherein the actuator is configured to monitor pressure and activate/deactivate apparatus in response to pressure.

15. The apparatus recited in claim 1, wherein the actuator is configured for non-electronic manual or mechanical activation comprising at least one of:
- a rupturable member that, when destroyed, actuates the actuator;
- a removable member that, when removed manually, actuates the actuator; and
- a mechanism that is actuated magnetically to actuate the actuator.

16. The apparatus recited in claim 1, wherein the actuator comprises at least one of RF transducers, tags, interrogators, and receivers adapted to provide information regarding the apparatus and actuate the apparatus in response to an RF signal applied externally to the enclosure via a controller.

17. The apparatus recited in claim 1, wherein the actuator comprises a wireless inductive charging power supply.

18. The apparatus recited in claim 1, further comprising a casing in which the electrochemical cell is disposed, wherein the casing provides fluid communication for exposing the cathode to the gases.

19. The apparatus recited in claim 1, wherein the power supply comprises a lithium-ion battery.

* * * * *